United States Patent

Termont

[15] 3,680,651
[45] Aug. 1, 1972

[54] FUNCTIONAL COUNTERWEIGHT SYSTEM FOR A TRACK LAYING TRACTOR

[72] Inventor: Charles George Termont, Dubuque, Iowa

[73] Assignee: Deere & Company, Moline, Ill.

[22] Filed: March 11, 1970

[21] Appl. No.: 18,562

[52] U.S. Cl. .............. 180/9.4, 180/9.62, 280/150 E, 301/41 W
[51] Int. Cl. ............................................. B62d 55/00
[58] Field of Search..... 180/9.2, 9.4, 9.42, 9.62, 69.1, 180/496; 280/150 E; 301/41 W

[56] References Cited

UNITED STATES PATENTS 1,744,516  1/1930  Whitacre ................. 180/9.62 X
2,425,057  8/1947  Zink ...................... 280/150 E X Primary Examiner—Richard J. Johnson
Attorney—H. Vincent Harsha, Harold M. Knoth, William A. Murray and John M. Nolan

[57] ABSTRACT

A functional counterweight system is provided for a track laying tractor and includes first counterweights secured respectively to the outer faces of the track drive sprockets and a second counterweight secured to the underside of the tractor transmission housing between the final drive housings. The first counterweights serve functionally as guards for the drive sprockets and the second counterweight serves functionally as a drawbar and as a bottom guard for the transmission housing.

7 Claims, 3 Drawing Figures

INVENTOR.
CHARLES G. TERMONT

INVENTOR.
CHARLES G. TERMONT

FUNCTIONAL COUNTERWEIGHT SYSTEM FOR A TRACK LAYING TRACTOR

BACKGROUND OF THE INVENTION

This invention relates to a counterweight system for a track laying tractor and more particularly relates to a counterweight system which is mounted on the tractor in normally unused space and which serves functionally as a drawbar and as guards for the transmission housing and track drive sprockets. Track laying tractors are often used with attachment combinations which include rear-attached equipment, such as rippers or backhoes, and front-attached equipment, such as loaders or bulldozers. When these combinations are used, the rear-mounted equipment serves as counterweight or ballast for the front-mounted equipment, and there is usually no need for additional ballast. However, when only front-attached equipment is used, it is often necessary to add ballast to the rear of the tractor. Heretofore, ballast added to the rear of the tractor has been placed so as to interfere with the subsequent mounting of rear-attached equipment, thus necessitating the removal of the ballast resulting in costly downtime.

SUMMARY OF THE INVENTION

According to the present invention, there is provided a novel counterweight system for a track laying tractor and more particularly, there is provided a system which functions other than just as dead weight.

A further object is to provide a counterweight system which is mounted in normally unused spaced on the tractor and which does not interfere with the mounting or operation of front- or rear-attached equipment.

A more specific object is to provide a counterweight system that functions as a drawbar and as guards for the transmission housing and track drive sprockets.

These and other objects will become apparent from the ensuing description and appended drawings.

DESCRIPTION OF THE PREFERRED EMBODIMENT

Figure 1:
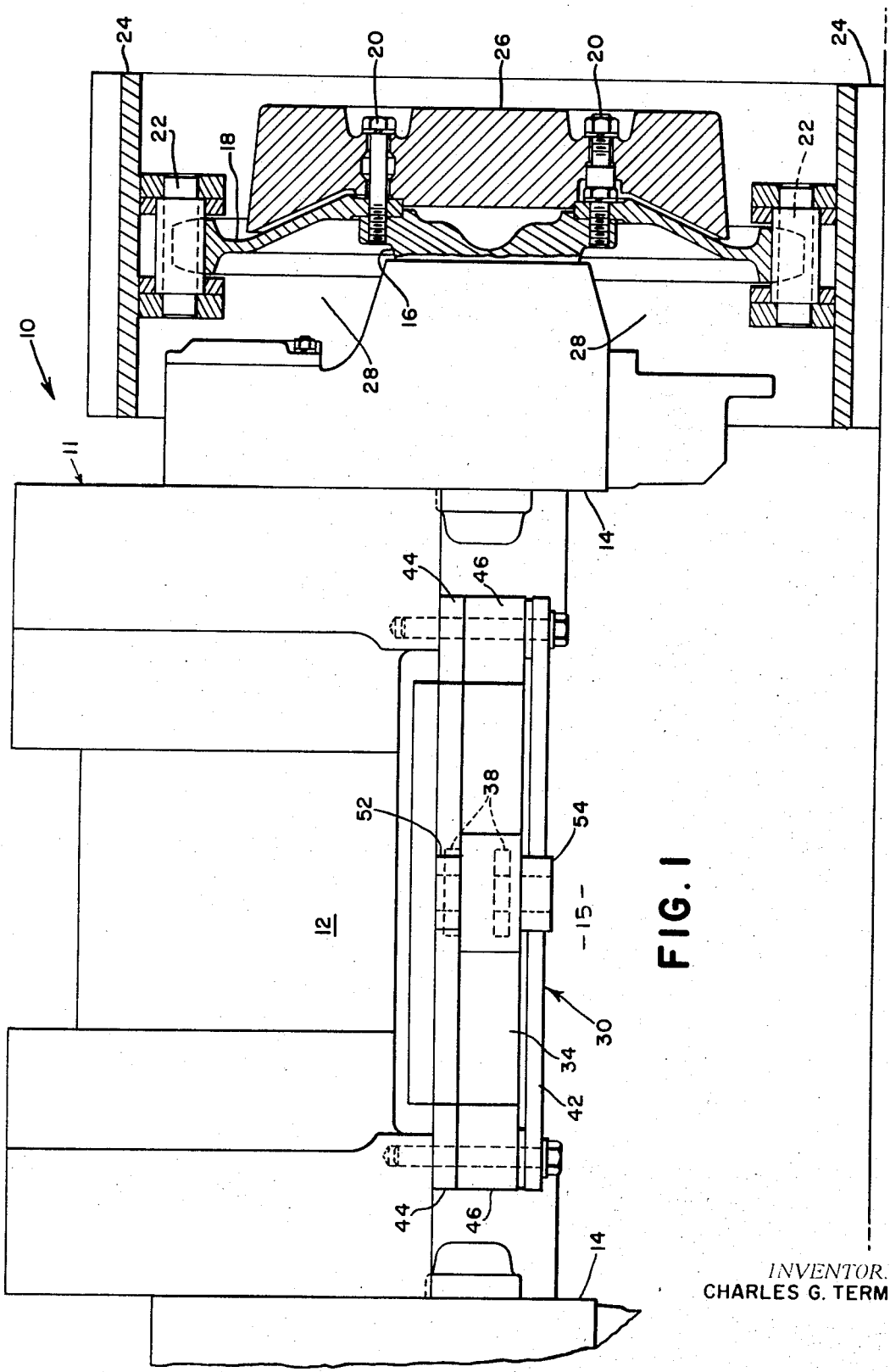
FIG. 1 is a partial rear elevational view of a track laying tractor showing the counterweight system of the present invention installed and parts being shown in section.
Figure 2:
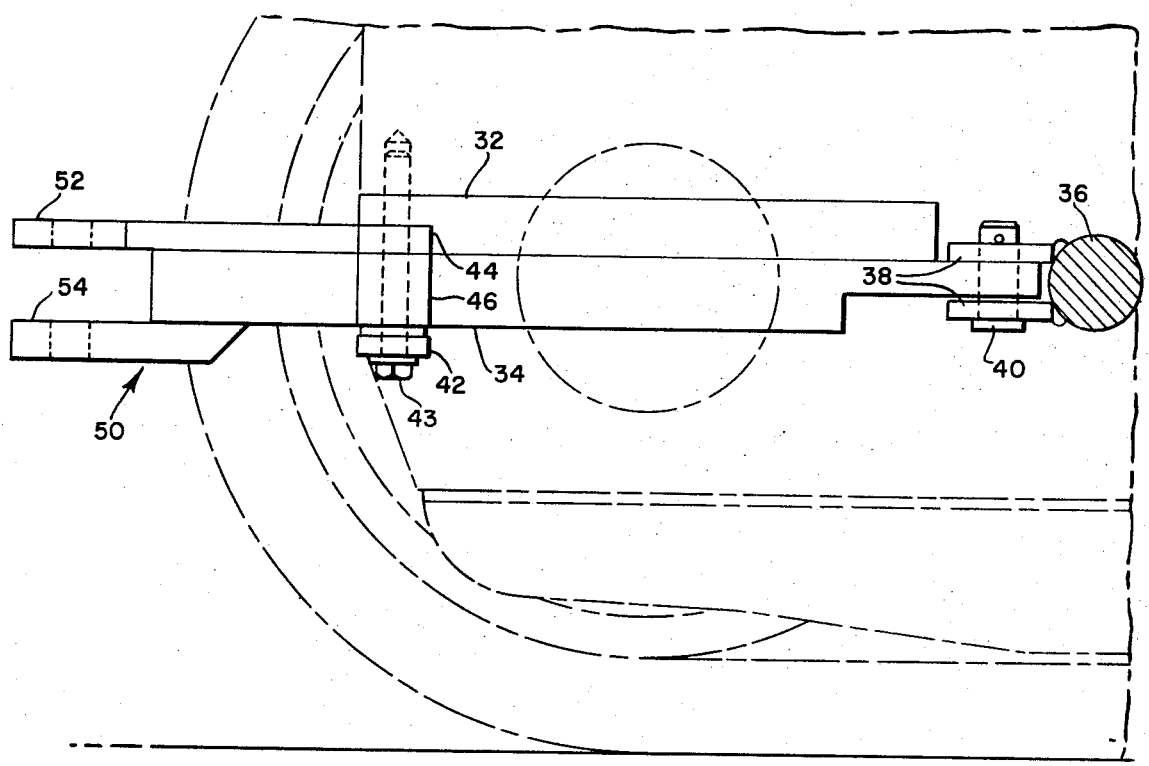
FIG. 2 is a side view of the central counterweight shown in FIG. 1, with the tractor chassis being shown in broken lines.
Figure 3:
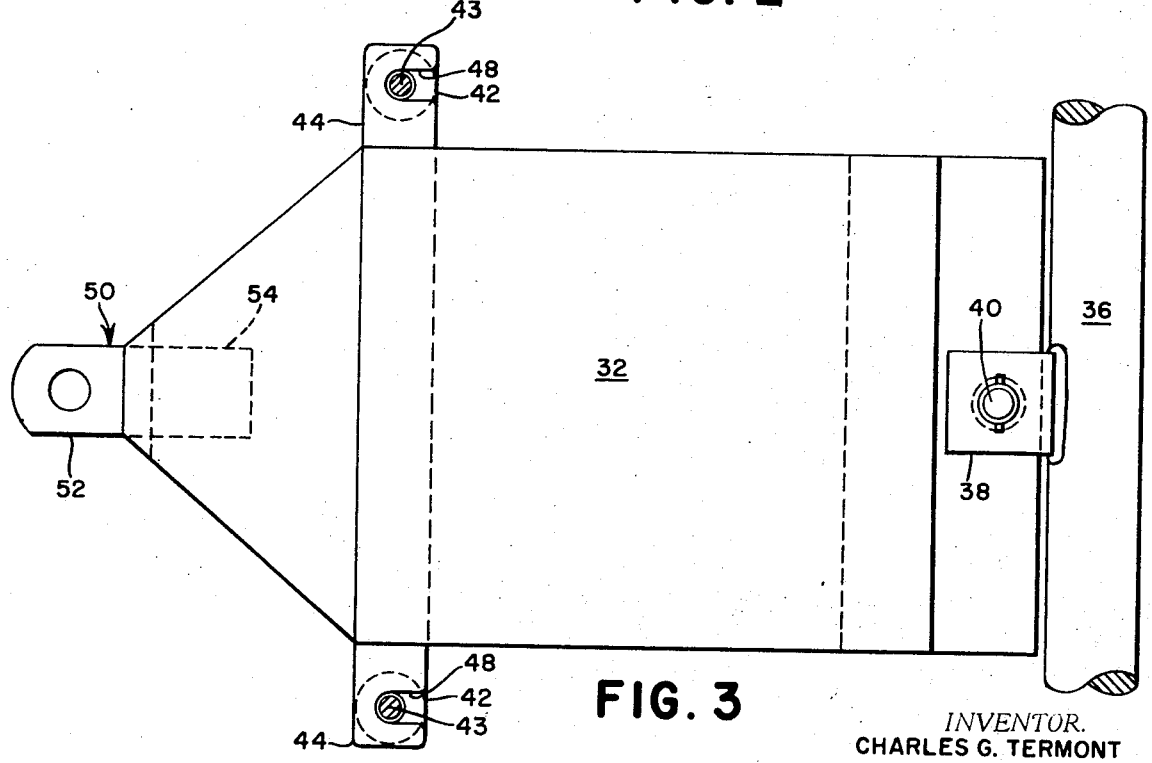
FIG. 3 is a top view of the counterweight shown in FIG. 2.

Referring now to FIG. 1, there is shown the rear end of a track laying tractor indicated in its entirety by the reference numeral 10. The tractor 10 has a chassis 11 including a centrally disposed transmission housing 12 having downwardly extending final drive housings 14, at its opposite sides, in which are located transversely extending drive shafts (not shown). As viewed in FIG. 1, the undersurface of the housing 12 and the opposed inner surfaces of the housings 14 cooperate to define a space 15 having a generally inverted U-shape.

Inasmuch as the left and right sides of the tractor 10 are identical, only the right side, as viewed from the rear, is illustrated and described. The right drive shaft terminates in a hub 16 to which a track drive sprocket 18 is secured by means of a plurality of screws 20. The sprocket 18 drivingly engages track link pins 22 of an endless track 24. The screws 20 additionally extend through apertures in a generally circular counterweight 26 which is shaped to fit closely adjacent the outer face of the sprocket 18 and act as a protective guard for the sprocket. While not shown, it is to be understood that additional provision may be made for mounting another circular counterweight in the space 28 around the inside face of the sprocket 18.

Fixed centrally on the tractor 10 to the underside of the transmission housing 12 and between the final drive housings 14 is a counterweight 30. The counterweight 30, for simplicity, is shown as a composite weight made up of superposed, upper and lower plates 32 and 34, respectively, which are generally rectangular in plan view it being understood that a different number of plates as well as plates of different dimensions may be provided as desired and/or as dictated by the shape of the tractor involved. The tractor 10 is a known type having a transverse pivot shaft 36 just forwardly of the drive sprockets 18 interconnecting track support frames (not shown) at the opposite sides of the tractor. A pair of vertically spaced ears 38 are fixed to and extend rearwardly from the middle of the shaft 36. The forward end of the lower plate 34 is received between the ears 38 and is secured thereto by a connection pin 40 which extends through aligned apertures in the ears and the plate. The plates 32 and 34 are supported adjacent the rear of the tractor 10 by a rectangular crossbar 42 which is secured to the transmission housing 12 by a pair of transversely spaced screws 43. At the opposite sides of the plates 32 and 34 are outwardly extending ears 44 and 46, respectively, which have forwardly opening notches 48 engaged with the screws 38. Thus, as can be clearly seen from FIG. 1, the ears 44 and 46 are securely sandwiched between the heads of the screws 38 and the bottom of the transmission housing 10 when the screws are drawn tight.

The opposite sides of the plates 32 and 34 converge rearwardly from the housing 12 to form a drawbar hitch 50 including an upper apertured ear 52 affixed to the plate 32 and a lower apertured ear 54 affixed to the plate 34. It is to be noted that pulling forces on the hitch 50 act almost entirely through the bottom plate 34, the connection pin 40, the ears 38 and thence through the shaft 36.

Thus, it will be appreciated that the counterweights 26 connected to the outer faces of the sprockets 18 and the counterweight 30 connected to the underside of the transmission housing 12 cooperate as a counterweight system which functions also as guards for the drive sprocket 18 and the underside of the transmission housing 12 and as a drawbar.

The operation of the counterweights is thought to be obvious from the above description with further remarks that it is to be understood that the sprocket-mounted counterweights can be used alone or in combination with the central counterweight. Also, the places of attachment of the counterweights are spaces on the tractor 10 which are normally unused.

I claim:

1. In combination with a track laying tractor of the type having a chassis including a rearward centrally disposed transmission housing, a pair of final drive housings depending downwardly at the opposite sides of said transmission housing and a transverse pivot shaft located just forwardly of the drive housings, and the transmission housing having a downwardly facing surface cooperating with opposed inwardly facing surfaces of said final drive housings to define a space having, when viewed from the rear of the tractor, a generally inverted U-shape, a functional weight assembly, comprising: a counterweight means shaped to conform generally to the bottom of said space and underlying a substantial portion of said downwardly facing surface and having a forward end located adjacent to and extending parallel to a substantial portion of the length of said pivot shaft; and fastening means located entirely beneath said chassis at laterally spaced locations rearwardly of the pivot shaft securing said counterweight means to said chassis, whereby protection is provided for the underside of said transmission housing.

2. The invention defined in claim 1 wherein said counterweight means is generally rectangular in plan view.

3. The invention defined in claim 1 wherein said counterweight means includes hitch means at its rearward end.

4. The invention defined in claim 3 wherein said counterweight means includes at least two superposed plates and said plates having rearwardly extending portions cooperating to form said hitch.

5. In combination with a track laying tractor of the type having a chassis including a rearward centrally disposed transmission housing, a pair of final drive housings depending downwardly at the opposite sides of said transmission housing and a transverse pivot shaft located just forwardly of the drive housings, and the transmission housing having a downwardly facing surface cooperating with opposed inwardly facing surfaces of said final drive housings to define a space having, when viewed from the rear of the tractor, a generally inverted U-shape, a functional weight assembly, comprising: a counterweight means being generally rectangular in plan view and shaped to conform generally to the bottom of said space and underlying a substantial portion of said downwardly facing surface; and fastening means securing the forward end of said counterweight means to said pivot shaft and securing the opposite sides of said counterweight means to the undersurface of the transmission housing at respective laterally spaced locations adjacent the rear of the transmission housing.

6. The invention defined in claim 5 wherein said counterweight means includes a pair of ears respectively extending outwardly at its opposite sides and underlying said spaced locations adjacent the rear end of said transmission housing, said pair of ears each having a forwardly opening notch, and said fastening means including a pair of screws respectively extending through said notches and into said transmission housing.

7. The invention defined in claim 6 wherein said fastening means further includes a crossbar extending between and underlying said ears and said pair of screws also extending through said crossbar.

* * * * *